United States Patent [19]

Conradsson

[11] Patent Number: 4,826,370
[45] Date of Patent: May 2, 1989

[54] INDICATOR DEVICE
[75] Inventor: Ake Conradsson, Bredaryd, Sweden
[73] Assignee: Industriverktyg AB, Bredaryd, Sweden
[21] Appl. No.: 3,001
[22] PCT Filed: Mar. 25, 1986
[86] PCT No.: PCT/SE86/00133
  § 371 Date: Jan. 27, 1987
  § 102(e) Date: Jan. 27, 1987
[87] PCT Pub. No.: WO86/05735
  PCT Pub. Date: Oct. 9, 1986
[30] Foreign Application Priority Data
  Apr. 1, 1985 [SE] Sweden .............. 85 01606-1
[51] Int. Cl.[4] .................................. B23Q 15/22
[52] U.S. Cl. ............................ 409/218; 33/638;
           33/642; 340/680; 408/16
[58] Field of Search ............... 408/6, 8, 13, 16;
      409/204, 210, 214, 218; 33/628, 638, 642;
                                340/679, 680, 686

[56] References Cited
U.S. PATENT DOCUMENTS

| 816,307 | 3/1906 | Eaton | 409/210 |
|---|---|---|---|
| 3,270,329 | 8/1966 | Schnell | 340/680 |
| 3,481,247 | 12/1969 | Hayes | 409/218 |
| 3,553,671 | 1/1971 | Hopkins | 340/679 |
| 3,636,814 | 1/1972 | Each | 408/8 |
| 3,684,939 | 8/1972 | Perry | 33/628 |
| 4,326,824 | 4/1982 | Lasermann et al. | 409/218 |

FOREIGN PATENT DOCUMENTS

| 31565 | 3/1980 | Japan | 408/6 |
|---|---|---|---|
| 160044 | 9/1983 | Japan | 408/8 |
| 0125907 | 8/1949 | Sweden . | |

Primary Examiner—Gil Weidenfeld
Assistant Examiner—Daniel W. Howell
Attorney, Agent, or Firm—Young & Thompson

[57] ABSTRACT

Indicator device for determining the distance between a workpiece set up in a working machine, and a tool set up in said machine. The device comprises a lower portion (2) with an underside (13) which is adapted to lie against the workpiece, and an upper portion (1) with a topside (8) against which the tool is intended to come into contact, the topside being parallel to the underside (13) of the lower portion and movable towards the underside against the effect of a resilient force. A voltage source (4) and an indicator (5) are provided. The underside (13) and the topside (8) are electrically conductive but are insulated from each other, and the indicator (5) and the voltage sorce (4) are electrically coupled so that the indicator (5) provides and indication when a circuit (16) between the topside (8) and the underside (13) is closed via the workpiece, the machine, the tool, the voltage source (4) and the indicator (5).

2 Claims, 1 Drawing Sheet

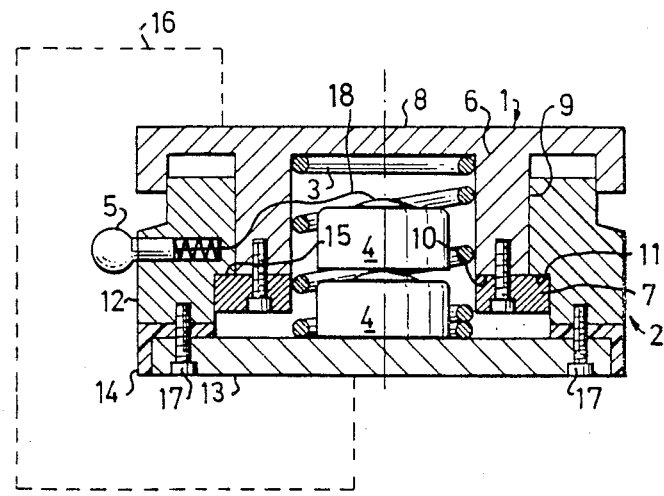

INDICATOR DEVICE

The present invention relates to an indicator device for determining the distance between a workpiece set up in a working machine, and a tool set up in said machine, said device comprising a lower portion with an underside which is adapted to lie against the workpiece, an upper portion with a topside against which the tool is intended to come into contact, said topside being parallel to the underside of the lower portion and movable towards said underside against the effect of a resilient force, a voltage source and an indicator means.

When working workpieces in a machine, such as a milling machine, boring mill, lathe, planer, shaping machine, drill or the like, it is often necessary to determine exactly the distance between the workpiece and the working tool. It is a frequent occurrence that a shank end cutter in a milling machine for example must be removed and replaced because it has become dull or has the wrong dimension for continued working. The problem then arising consists in being able to place the new cutter in exactly the same position relative to the workpiece as the cutter removed.

This problem has been solved previously for milling machines by moving the newly mounted cutter under rotation slowly towards the workpiece, and resetting the zero of the machine scale when the cutter just barely touches the workpiece. If the workpiece has had a precision ground or polished surface or is otherwise easily damaged, it is not possible to rotate the cutter when setting it against said surface. In this case thin brass leaf or the like is placed on the surface of the workpiece, and the cutter is carefully moved into contact with the brass leaf. The scales of the mill are then reset taking into account the thickness of the brass leaf. These two methods have essentially been used to determine the distance between a workpiece and a tool in the above mentioned machine types as well.

The two methods described above have, however, the disadvantages that they are slow, consuming an unnecessary amount of costly machine time, that the sharpened edge of the tool is easily broken particularly when the tool is not rotated, thus necessitating replacement of the tool and repetition of the process, and risk of often irrepairable damage to the workpiece surface. Finally, the above methods are not particularly precise.

Swedish Patent Specification No. 125 907 shows a device for determining the distance between a tool and a workpiece in a machine, within certain intervals. This device comprises a lower portion with an underside which is intended to be attached to the workpiece, and an upper portion with a topside which is parallel to the underside and is intended to make contact with the tool. The upper portion is spring-mounted. The device also comprises a current source and an indicator means, which are arranged so that the indicator means gives different readings as the upper portion is pressed down towards the bottom portion. This device is intended for determining the distance between a tool and a workpiece within certain intervals. Furthermore, this device is made up of a number of different components, which can give rise to variations in the levels at which the indications are sent when used at different times.

In order to correct the above problems, according to the invention there is suggested a device of the above mentioned type which is characterized in that the underside is electrically insulated from the topside, and in that the indicator means and the voltage source are coupled so that the indicator means provides an indication when a circuit between the topside and the underside is closed via the workpiece, the machine and the tool.

One embodiment of the device according to the invention will be described in more detail below with reference to the accompanying drawing, which shows a cross section through the device according to the invention.

As can be seen in the drawing, the device comprises an upper portion 1, a lower portion 2, a spring 3 acting therebetween, a voltage source in the form of batteries 4 and an indicator means in the form of a light 5. The upper portion 1 comprises a first part 6 and a second part 7. The first part 6 consists of an upper round flat disc 8 from the underside of which there extends a tubular part 9. The tubular part 9 terminates at a flat surface 10, which is parallel to the topside of the disc 8. The second part 7 is mounted against this surface 10. The second part consists of an annular washer with a rectangular cross section and an inner diameter essentially equal to that of the tubular part 9 and an outer diameter exceeding that of the tubular part 9. A shoulder 11 is formed thereby, which runs all the way around the tubular part 9 and is parallel to the topside of the round flat disc 8. The function of this surface will be described later.

The lower portion 2 comprises a tubular part 12 and a round plate 13, between which there is mounted an intermediate washer 14, the function of which is to electrically separate the parts 12 and 13, and therefore the washer 14 is preferably made of a suitable plastics material. The portion 12 has an outer diameter which is essentially the same as that of the round flat disc 8. The interior of the part 12 has two different diameters, the transition between these two diameters forming a shoulder 15 parallel to the underside of the round plate 13. The function of said shoulder will be described below. The round plate 13 has a diameter which is essentially the same as the outer diameter of the tubular part 12. The round plate 13 is mounted by means of electrically insulated screws 17 to the tubular part 12 with the electrically non-conductive part 14 lying therebetween.

The helical spring 3 disposed between the upper portion 1 and the lower portion 2 presses the portions 1 and 2 apart. The portions are, however, held in contact with each other because the shoulders 11 and 15 abut one another. The abutment surface 11 of the shoulder is parallel to the topside of the round flat disc 8, and when the shoulder 15 is parallel to the underside of the round plate 13, the topside 8 and the underside 13 will consequently be parallel. When the device is not affected by external forces, these last mentioned sides will always be at a predetermined distance from each other. This distance is of course dependent on the dimensions of the various components.

The helical spring 3 shown in the Figure can be replaced by any elastic means capable of forcing the portions 1 and 2 apart, e.g. an elastic polymer material, an air cushion, a hydraulic device or the like.

The batteries 4 and the light 5 in the embodiment shown are coupled by means of wires 18 so that the light is activated when a circuit is closed externally between the upper portion 1 and the round plate 13, as indicated by the dashed line 16 in the Figure.

The indicator means 5 can, instead of the incandescent lamp shown, be a light emitting diode, an acoustic device, an electric wire, a radiating device or the like.

A typical use of the device in a milling machine for example would proceed as follows: The device is placed with its underside 13 on the workpiece (not shown) in relation to which the position of the tool, a shank end cutter (not shown) for example, is to be determined. The topside 8 is then moved into contact with the shank end cutter. The circuit 16 is thus closed between the underside 13 and the topside 8 via the workpiece, the milling machine and the shank end cutter, and the light 5 is turned on. It makes no difference if the topside 8 and the tool are moved into contact in such a manner that the distance between the workpiece and the tool is less than the distance between the top- and undersides of the device when unloaded, due to the fact that the topside can be depressed against the resilient force of the spring 3. This eliminates the risk of damaging the sharp edge of the tool.

After the tool has come into contact with the topside of the device, the workpiece and the device are displaced away from the tool, and the electric circuit is broken and the light 5 goes out. In precisely that position where the light is turned off, that is where the machine scales are set taking into account the thickness of the indicator device. Thus an exact setting of the tool in relationship to the workpiece is achieved without the tool ever having come into contact with the workpiece, thus eliminating risk of damage to an easily damaged workpiece surface.

The invention is of course not limited to the embodiment described above, but can be varied within the scope of the following patent claims.

I claim:

1. Indicator device for determining the distance between a workpiece set up in a working machine, and a tool set up in a said machine, said device comprising a lower portion (2) with an underside (13) which is adapted to lie against the workpiece, an upper portion (1) with a topside (8) against which the tool is intended to come into contact, resilient means to exert a resilient force on said upper portion, said topside being parallel to the underside (13) of the lower portion and movable towards said underside against the effect of said resilient force, a voltage source (4) and an indicator means (5), the underside (13) and the topside 8 being electrically conductive, insulator means to insulate said underside and topside from each other, and conductive means electrically coupling the indicator means (5) and the voltage source (4) so that the indicator means (5) provides an indication when a circuit (16) between the topside (8) and the underside (13) is closed via the workpiece, the machine, the tool, the voltage source (4) and the indicator means (5).

2. Device according to claim 1, characterized in that the distance between the topside (8) and the underside (13) in the unloaded state is determined by abutment surfaces (11,15) on the upper portion and the lower portion when they abut one another under the influence of the resilient force acting between said portions.

* * * * *